United States Patent Office 3,147,549
Patented Sept. 8, 1964

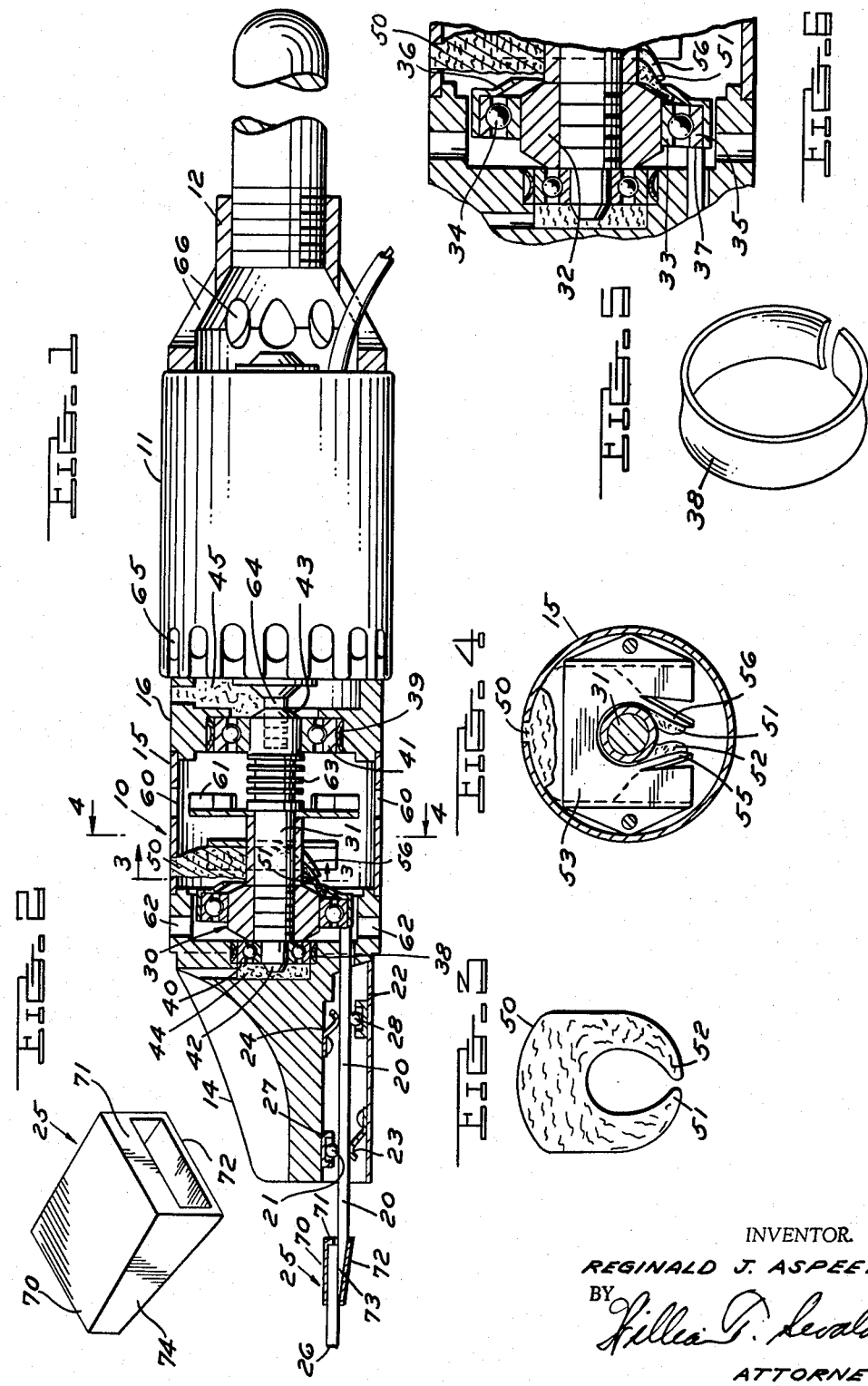

3,147,549
HIGH SPEED POWER SCRAPER TOOL
Reginald J. Aspeek, 8403 Millis Road, Utica, Mich.
Filed Oct. 21, 1963, Ser. No. 317,534
5 Claims. (Cl. 30—272)

This invention relates to power scraper tools and in particular to a tool having a novel wobble plate drive and novel supports, motor drive, lubrication, and cooling enabling the tool to run at very high speeds for long periods of time. This application is a continuation-in-part of my co-pending application Serial Number 195,560 filed May 17, 1962 for a Power Scraper Tool.

Scraper tools are used to remove minute quantities of material from the surface of metal parts for various reasons such as to remove a high spot, to create a low spot, to shape surfaces as in bearings, etc. The high precision and minute tolerances allowable in modern industry together with the denseness, toughness, and hardness of the metals produced by modern metallurgy makes the final scraping of parts more precise and more difficult.

Slow speed scrapers have not been found satisfactory as they cannot scrapingly engage the surface of material with a very shallow cut with light force as they merely slide on the surface. With heavy force they bite in too deep and tend to dig into the surface once engagement is made. This causes nicks and mars and too often causes the tool to chatter causing surface damage.

However, high speed scrapers have not been successful heretofore because they have not been able to operate satisfactorily at the high speeds such as in excess of ten thousand revolutions or oscillations per minute. Among the causes of failure are the mass of blades and holders, friction between blades and drivers, improper lubrication, lack of suitable cooling system, whip of cantilevered shafts, vibration, and lubricant friction. These problems, among others, resulted in excessive heating of the tool, vibration, and excessive power loss so that the tool could not operate satisfactorily.

With the foregoing in view it is a primary object of the invention to provide a scraper tool having very high speed short scraping strokes capable of removing minute quantities of material from the surfaces of metal parts with accuracy and force commensurate with precise tolerance and material resistance problems.

An object of the invention is to provide a high speed scraper tool which reduces relative motion between the blade and the wobble plate drive to a minimum to eliminate friction, heat, and power loss.

An object of the invention is to provide a high speed scraper tool which has a wobble plate consisting of a bearing assembly with the outer race thereof freely rotationally disposed constituting the drive face in contact with the blade so that the outer race may lie rotationally stationary when in contact with the blade and may rotate with the rest of the assembly when not in contact with the blade to reduce relative motion between parts to a minimum to eliminate friction, heat, and power loss.

An object of the invention is to provide supporting bearings for the wobble plate drive shaft which hold the drive shaft at both ends to support the axially and angularly directed loads imposed thereon by the wobble plate without defection and whipping.

An object of the invention is to provide spring band retainer-holders for the bearing assemblies which are concavo-convex in cross-section with the convex inner side allowing the bearing assembly to self-align itself on the axis of the drive shaft.

An object of the invention is to support the adjacent end of the motor shaft on the drive shaft in concentric alignment with the drive shaft to eliminate eccentricity and vibration therebetween to reduce friction, heat and power loss.

An object of the invention is to provide a novel tip holder for the blade which is self-tightening and which is easily removed permitting a workman to easily reposition a tip to use all eight cutting edges.

An object of the invention is to provide novel lubricating means furnishing minimal but adequate lubricant to relatively moving parts to eliminate lubricant loads, centrifuging, fluid blockading, friction, heat and power loss.

An object of the invention is to provide novel air circulation cooling means to carry off heat generated by parts moving relative to one another and to carry off lubricant discharges to eliminate heat and power loss.

These and other objects of the invention will become apparent from the following description of a high speed scraper tool embodying the invention taken in connection with the accompanying drawings, in which:

FIG. 1 is a side view of the scraper tool shown partly in elevation and partly in cross-section.

FIG. 2 is an enlarged perspective view of the tip retainer-holder for the blade.

FIG. 3 is a cross-sectional view of FIG. 1, taken on the line 3—3 thereof showing the lubricant pad.

FIG. 4 is a cross-sectional view of FIG. 1 taken on the line 4—4 thereof showing the lubricant pad and support plate.

FIG. 5 is an enlarged perspective view of the spring-band bearing retainer-holder; and FIG. 6 is an enlarged cross-sectional view of the wobble plate assembly portion of FIG. 1.

Referring now to the drawings wherein like numerals refer to like and corresponding parts throughout the several views, the novel high speed scraper tool shown therein to illustrate the invention, comprises a housing 10, motor 11, and handle 12. The housing 10 is composed of a front nose 14, an intermediate ring 15, and a rear block 16. They are attached by interfitting flanges and grooves and tie-bolts, now shown, as is well understood in manufacturing; they may be otherwise connected if desired.

A blade 20 is slidably carried by the nose 12 on a bearing 21 and a bearing 22. A leaf spring 23 holds the blade 20 against the bearing 21 and a leaf spring 24 holds the blade 20 against the bearing 22. The bearings 21 and 22 roll on the blocks 27 and 28. The bearings 21 and 22 are retained at their ends in slots in the nose 14. Downward pressure on the nose 14 urging the blade 20 into engagement with a workpiece is supported by the bearings 21 and 22. The blade 20 is equipped with a holder 25 and a carbide tip 26 if desired. Also the tip may be sintered on the blade 20. The blade is supported at its sides by slide bearings in the nose 14.

The blade 20 is free of mechanical interlock with the housing 10. The blade 20 is frictionally positioned by the leaf springs 23 and 24. Blades 20 are easily inserted and removed. The blade 20 constitutes the minimum reciprocating mass.

A wobble plate assembly 30 is carried by a drive shaft 31. The wobble plate assembly 30 consists of a hub 32 threaded on the drive shaft 31, an inner race 33 pressed on the hub 32, bearings 34, and outer race 35, and a slanting annular flange 36 fixed on the outer race 35. The flange 36 has a central opening. The central opening in the flange 36 is provided so that oil wicks may extend through the central opening and wipe oil on the interior of the flange 36 as hereinafter more fully explained. The outer race 35 has an annular radial side surface constituting the drive face 37 of the wobble plate assembly 30. The drive face 37 drives against the inner end of the blade 20. The wobble plate assembly 30 is disposed at an angle to a plane normal to the axis of the drive shaft 31. The drive face 37 therefore moves axially as it rotates in the radial location of the blade 20. The hub 32 may have a peripheral surface lying at an angle relative to the shaft axis to produce the wobble of the drive face 37.

Annular spring bands 38 and 39 lie in the bores of the nose 14 and block 16 respectively and surround the outer races of the bearing assemblies 40 and 41 respectively. The bands 38 and 39 are concavo-convex in cross-section with the concave side lying radially outwardly and the convex side extending inwardly. The convex arcuate crown contacts the outer race on the bearing assemblies permitting self-alignment while the edges of the concave outer side engage the walls of the bores in the nose and block. The spring action of the bands 38 and 39 facilitates precise fit and bearing alignment in even rough bored holes and economical manufacture and assembly.

Forward manual movement of the blade 20 against a workpiece provides reaction to move the blade 20 inwardly against the drive face 37 of the wobble plate assembly 30. The wobble plate assembly 30 as it rotates drives the blade 20 outwardly.

The nose 14 supports a front bearing assembly 40 which rotatably supports the front end of the drive shaft 31. The block 16 supports a rear bearing assembly 41 which rotatably supports the rear end of the shaft 31.

The shaft 31 is thereby supported at both ends with the wobble plate assembly lying between the supporting bearing assemblies 40 and 41. Thus the loads imposed by the wobble plate on the shaft 31 cannot cause the shaft to whip.

The drive shaft 31 has a frusto-conical front end 42 extending endwise outwardly of the bearing assembly 40 and a frusto-conical rear end 43 extending endwise outwardly of the rear bearing assembly 41. An oil pad 44 wipes oil on the conical front end 42 of the shaft and an oil pad 45 wipes oil on the conical rear end 43 of the shaft. The slanting sides of the conical ends 42 and 43 lead radially outwardly to the bearing assemblies 40 and 41 respectively.

As the shaft 31 rotates, a light film of oil on the conical ends 42 and 43 is moved radially outwardly by centrifugal force and fed to the bearing assemblies 40 and 41 to lubricate them.

There is no excess oil in the bearing assemblies 40 and 41 as centrifugal force drives out fluid oil leaving only a lubricating oil film. The excess oil enters the interior of the housing 10 and is carried off by the air circulation of the cooling system.

Thus the bearings are lubricated but there is reduced lubricant friction incident to excess lubricant. This enables the bearing assemblies to rotate at high speed with low friction, heat and power loss.

An oil pad 50 has depending arcuate arms 51 and 52 surrounding the shaft 31 adjacent the wobble plate assembly 30. The arms 51 and 52 also curve axially and their ends extend through the central opening in the flange 36 on the outer race 35 of the wobble plate assembly 30. The bracket 53 has arcuate axially curving fingers 55 and 56 extending toward the flange opening 38 holding the oil pad arms 51 and 52 respectively with their ends inside the flange 36 in wiping contact with the interior surface of the flange 36.

Oil on the interior surface of the flange 36 is driven centrifugally outwardly when the flange 36 rotates with the outer race 35 of the wobble plate assembly 30. This feeds oil to the inner bearing surface of the outer race 35. The oil moves axially across the inner surface of the outer race and then moves radially across the drive face 37 of the outer race 35 to lubricate relative movement between the drive face 37 and the inner end of the blade 20 when it occurs.

Oil on the outer race 35 lubricates the bearings 34 which in turn lubricate the outer surface of the inner race 33. There is no excess of oil in the wobble plate assembly as all excess oil is driven out by centrifugal force leaving only a lubricating film.

Thus the wobble plate assembly 30 is lubricated and any relative motion contact with the blade 20 is lubricated but there is no excess lubricant and incident lubricant friction. This enables the wobble plate assembly to rotate at high speeds with much less friction, heat and power loss.

The housing ring 15 has air vents 60 leading from the interior of the housing 10. A fan 61 is fixed on the drive shaft 31 for rotation therewith. The nose 14 has air-intake openings 62 leading into the interior of the housing 10. The fan 61 drives air through the vents 60 and atmospheric pressure drives air through the intake openings 62 past the wobble plate assembly 10 carrying off heat. The air also circulates adjacent the front bearing assembly 40 and the rear bearing assembly 41 carrying off heat therefrom. The circulating air also carries off discharged excess oil in the form of mist and vapor adjacent the wobble plate 30 and the bearing assemblies 40 and 41. The drive shaft 31 has fins 63 in the path of air circulation dissipating heat from the shaft 31 collected by the shaft from the inner races of the bearing assemblies 40 and 41 and the wobble plate assembly 30.

The motor 11 has a motor shaft 64 threaded in the drive shaft 31. The shafts 31 and 64 lie on the same axis. The rear bearing assembly 41 supports this end of the motor shaft 64 through its connection to the drive shaft 31. The bearings in the motor 11 adjacent this end of the motor shaft 64 are removed. Thus there can be no eccentricity between the shafts 64 and 31 adjacent their interconnection. This obviates interference between adjacent bearings and eliminates incident friction, heat and power loss. The other end of the motor shaft 64 adjacent the handle 12 is supported by the usual motion bearing, not shown.

The motor 11 has a fan, not shown, adjacent the air vents 65 and the handle 12 has air intake openings 66 feeding air through the motor 11 for cooling the motor 11. The motor attains speeds in excess of 10,000 r.p.m. and rotates the drive shaft 31 and wobble plate plate assembly 30 at these high speeds.

The holder 25 has a flat top wall 70 overlying the tip 26, a back flange 71 depending from the top wall 70 behind the tip 26, a slanting bottom wall 72 camming against a tapered end 73 on the blade 20 and interconnecting side walls 74 lying between the top wall 70 and bottom wall 72 at the sides of the tip 26 and the blade 20. Inward pressure on the tip 26 against the flange 71 moves the bottom wall 72 against the tapered end of the blade 20 drawing the top wall 70 down on the tip 26 forcing it into contact with the blade 20. To remove the tip 26, an outward hammer tap on the holder 25 reverses the camming action and the holder 25 and tip 26 move off the blade 20.

The manner in which the high speed scraper tool is used is important to an understanding of its operation. The whole tool is manually moved in forward scraping strokes with the blade 20 or the tip 26 in contact with a workpiece. The resistance between the blade and the workpiece shoves the blade into the housing 10 and forces its inner end against the drive face 37 of the wobble plate assembly 30. In rearward manual return stroke of the whole tool the blade tip 26 is lifted off the workpiece. Thus in the return stroke there is no outward drag imposed on the blade 20 during tool use. The light springs 22 and 23 hold the blade in contact with the bearings 21 and 22 when the blade or tip is out of contact with a workpiece during return strokes.

The bearings 21 and 22 support the blade 20 during forward scraping strokes with the blade 20 or tip 26 in contact with a workpiece and, due to the location and inherent leverage of the bearings 21 and 22, they easily support the blade between downward pressure manually imposed on the tool and the resistance of the workpiece to force the blade 20 or tip 26 into scraping engagement with a workpiece.

The blade and wobble plate have four operating stages. The first stage is called the "idling condition," the second stage is called the "transition condition," the third stage is called the "drive condition," and the fourth stage is called the "return condition."

In the idling condition, the blade is out of contact with the wobble plate assembly. The blade 20 is at rest and the wobble plate assembly 30 rotates as a unit with the outer race 35 rotating at the same angular speed as the inner race 33 and drive shaft 31.

In the transition condition, the angularly stationary blade 20 is moved into contact with the angularly moving drive face 37 on the outer race 35 of the wobble plate assembly 30. During this condition the contact between the blade 20 and the drive face 37 stops rotational movement of the outer race 35 while the bearings 34 and inner race 33 continue to move angularly relative to the outer race 35.

In the drive condition, the outer race 35 and drive face 37 do not rotate while in contact with the blade 20. The bearings 34 orbit and the race 33 rotates with the hub 32 and the shaft 31 relative to the outer race 35.

In the return condition, the blade 20 lies out of contact with the drive face 37 on the outer race 35 leaving the outer race 35 free to rotate and during this condition the outer race 35 picks up rotational movement imparted to it by the rotating bearings 34 and inner race 33 and assumes the rotating idling condition.

While running idle, the blade is out of contact with the wobble plate assembly 30. Under this condition the wobble plate assembly 30 rotates as a unit with no relative motion between its parts. In this free running condition of the wobble plate, the outer race 35 and flange 36 rotate wiping oil off the oil pad legs 51 and 52 and delivering oil to the bearings 34 and drive face 37.

When the blade 20 is moved against the drive face 37 in a forward scraping stroke of the tool, the initial relative motion in their contact is lubricated until the pressure of the contact rotationally stops the rotational movement of the outer race 35. The outer race 35 then stays rotationally stationary and wobbles axially. This drives the blade 20 outwardly axially without any rotational or sliding motion occuring between the drive face 37 and the blade 20.

The axial inward force imposed on the blade 20 by contact with a workpiece in the forward scraping stroke maintains the contact between the blade and drive face by returning the blade 20 against the wobble plate drive face 37 as it moves axially inwardly at the radial position of the blade. The wobble plate drive face 37 as it wobbles axially outwardly at the radial position of the blade 20 drives the blade 20 axially outwardly.

It will be understood that the axial wobble of the wobble plate assembly 30 is relatively small such as in thousandths of an inch so that the blade is driven outwardly in very small, very fast incremental pulses as it moves forwardly on workpiece in the forward scraping stroke.

The very small, very fast forward drive pulses of the blade are so minute and so quick that the blade shaves a very thin layer of material from even very dense, hard, and tough workpieces with excellent control, without chatter, and without nicks and mars producing the desired removal of a very thin layer of material with ease, speed, and accuracy.

Due to the novel construction and operation of the wobble plate and drive blade, lubricating means, cooling means, and the common bearing supporting adjacent ends of the drive and motor shafts, the device is substantially free of mechanical and fluid friction and inherent heat and power loss so that a workman may use the tool for hours with excellent control and without loss of efficiency or damage.

While only one embodiment of the novel high speed power scraper tool has been shown and described in detail, it is obvious that many changes may be made in the size, shape, detail, and arrangements of the elements of the invention within the scope of the appended claims.

I claim:

1. A scraping tool movable in a forward scraping stroke over a workpiece surface to remove material therefrom comprising a housing,
   a blade extending from said housing;
   bearings supporting said blade for free linear travel, an outer end on said blade for scraping a workpiece;
   wobble plate reciprocating means constituting stop means relative to said blade limiting blade inward travel;
   said blade normally being out of contact with said wobble plate reciprocating means;
   said blade being movable inwardly against said wobble plate reciprocating means by engaging a workpiece surface with said blade outer end and moving said tool in a forward scraping stroke;
   said blade being alternately driven out by said wobble plate reciprocating means and returned by workpiece engagement in the forward scraping stroke;
   said wobble plate reciprocating means comprising a drive shaft;
   a bearing assembly on said shaft including an inner bearing race fixed on said shaft at a helical angle relative to said shaft and rotating with said shaft, and an outer bearing race anti-frictionally surrounding said inner bearing race;
   said outer race having a segment lying in the plane of said blade for axially contracting said blade at its inner end;
   said bearing races constituting a wobble plate for moving a segment of said outer bearing race towards and away from said blade inner end;
   said outer bearing race being capable of wobbling axially while standing rotationally stationary in contact with said blade inner end to obviate frictional engagement between said blade inner end and said outer race, and capable of rotating with said inner race when not in contact with said inner end of said blade to obviate relative motion and friction between said races.

2. In a device as set forth in claim 1, an annular flange fixed to said outer member having a central aperture surrounding said shaft defined by a circular inner edge; said flange having a radial wall portion between said outer member and said circular inner edge slanting radially outwardly to said outer member adjacent said inner bearings;
   said flange slanting wall having a surface facing said outer and inner bearings constituting an oil chute; and
   an oil wick in said housing having an end leading through said central aperture in said flange wiping against said flange surface facing said bearings;
   said annular flange rotating with said outer bearing member wiping oil from said wick and centrifugally driving said oil to said bearings to lubricate same;
   said flange blocking said outer bearing member and inner bearing on the side thereof opposite to said drive face on said outer bearing member forcing oil through said bearings to said drive face to lubricate same relative to said inner end of said blade to reduce friction between said drive face and said inner end of said blade during periods of relative movement therebetween to reduce heat and power loss.

3. In a device as set forth in claim 1,
   a top bearing in said housing over said blade adjacent the front of said housing,
   a bottom bearing in said housing under said blade spaced rearwardly of said top bearing,
   a first leaf spring holding said blade against said top bearing, and a second leaf spring holding said blade against said bottom bearing, said blade being freely manually insertable and removable between said bearings and said springs.

4. In a device as set forth in claim 1, said rear bearing assembly being relatively heavy duty;

a motor having a motor shaft connecting to said shaft adjacent said rear bearing assembly;

said motor having a bearing rotatably supporting said motor shaft at the end of said motor shaft remote from said rear bearing assembly;

said rear bearing assembly rotatably supporting said motor shaft at the end of said motor shaft adjacent thereto through the connection to said drive shaft preserving precise axial alignment of said drive shaft and motor shaft and eliminating eccentricities of separate bearings therebetween.

5. In a device as set forth in claim 1, said housing having air outlet vents radially of said shaft on one side of said wobble plate;

an air fan on said shaft for driving air in said housing radially outwardly through said vents;

said housing having air intake openings on the other side of said wobble plate;

said fan drawing air into said housing through said intake openings past said wobble plate to absorb heat therefrom and expelling the heat and air through said outlet vents.

References Cited in the file of this patent

UNITED STATES PATENTS

| | | |
|---|---|---|
| 341,664 | Krayer | May 11, 1886 |
| 350,856 | Wright | Oct. 12, 1886 |
| 878,031 | Adams | Feb. 4, 1908 |
| 1,476,033 | Anderson | Dec. 4, 1923 |
| 1,660,134 | Mernit | Feb. 21, 1928 |
| 1,838,186 | Moodhe | Dec. 29, 1931 |
| 1,860,122 | Wikander | May 24, 1932 |
| 2,161,335 | Cherry | June 6, 1939 |
| 2,183,100 | Holland | Dec. 12, 1939 |
| 2,722,072 | Aspeek | Nov. 1, 1955 |
| 2,948,526 | Maier | Aug. 9, 1960 |